(12) United States Patent
Kumacheva et al.

(10) Patent No.: US 6,214,500 B1
(45) Date of Patent: *Apr. 10, 2001

(54) CORE AND SHELL MATRIX COMPOSITIONS AND PROCESSES

(75) Inventors: Eugenia Kumacheva, Toronto; Jaan Noolandi, Mississauga; Olga Kalinina, Toronto, all of (CA)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,565

(22) Filed: Jul. 22, 1999

Related U.S. Application Data

(62) Division of application No. 09/067,067, filed on Apr. 27, 1998, now Pat. No. 5,952,131.

(51) Int. Cl.$^7$ .............................. G03C 1/73; G11B 7/00; G11B 7/26
(52) U.S. Cl. ........................ 430/21; 430/138; 430/139; 430/270.14; 430/321; 430/962
(58) Field of Search ...................... 430/21, 138, 139, 430/270.1, 270.14, 339, 962, 321

(56) References Cited

U.S. PATENT DOCUMENTS

| | | | |
|---|---|---|---|
| 3,946,367 | 3/1976 | Wohlmut et al. | 340/173 LM |
| 4,224,398 | * 9/1980 | Muzyczko et al. | 430/175 |
| 4,803,688 | 2/1989 | Lawandy | 372/21 |
| 4,864,537 | 9/1989 | Michl et al. | 365/127 |
| 4,879,709 | 11/1989 | Clark | 369/284 |
| 4,937,119 | 6/1990 | Nikles et al. | 428/64 |
| 5,268,862 | 12/1993 | Rentzepis | 365/151 |
| 5,289,407 | 2/1994 | Strickler et al. | 365/106 |
| 5,326,692 | 7/1994 | Brinkley et al. | 435/6 |
| 5,445,853 | 8/1995 | Hayashi et al. | 428/64.4 |
| 5,449,590 | 9/1995 | Imaino et al. | 430/273 |
| 5,573,909 | 11/1996 | Singer et al. | 435/6 |
| 5,592,461 | 1/1997 | Tsujioka et al. | 369/126 |
| 5,627,817 | 5/1997 | Rosen et al. | 369/58 |
| 5,648,135 | 7/1997 | Watanabe et al. | 428/64.8 |
| 5,952,131 | * 9/1999 | Kumacheva et al. | 430/21 |

FOREIGN PATENT DOCUMENTS

| | | |
|---|---|---|
| 0 302 610 | * 2/1989 | (EP) . |
| 0 518 487 | * 12/1992 | (EP) . |
| 2-133666 | * 5/1990 | (JP) . |
| 9-296106 | * 11/1997 | (JP) . |

OTHER PUBLICATIONS

S. Lepizzera, M. Scheer C. Fond, T. Pith, M. Lambla and J. Lang, Coalesced Core/Shell Latex Films under Elongation Imaged by Atomic Force Microscopy, *Macromolecules* 1997, 30, 7953–7957.

* cited by examiner

Primary Examiner—John A. McPherson
(74) Attorney, Agent, or Firm—John L. Haack

(57) ABSTRACT

A composition including a matrix comprised of particles comprised of a core resin and a shell resin thereover, wherein the core resin contains a covalently bonded photosensitive compound, and wherein the shell resin is the continuous phase of the matrix.

19 Claims, 1 Drawing Sheet

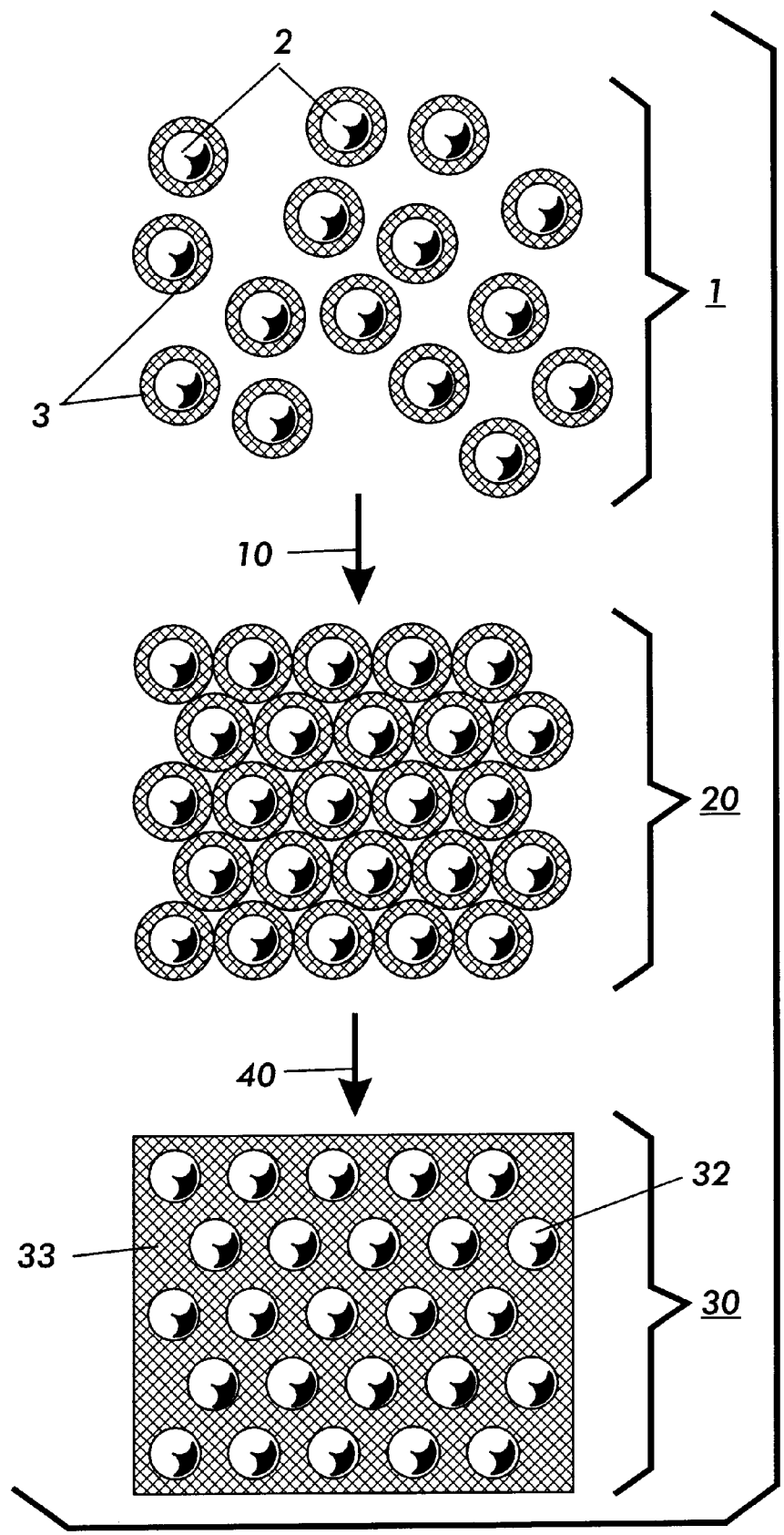

CORE AND SHELL MATRIX COMPOSITIONS AND PROCESSES

This application is a divisional of application Ser. No. 09/067,067, filed Apr. 27, 1998, now U.S. Pat. No. 5,952,131.

REFERENCE TO COPENDING AND ISSUED PATENTS

Attention is directed to commonly owned and assigned U.S. Pat. No. 5,633,109, entitled "Ink Compositions With Liposomes Containing Photochromic Compounds," and which application discloses an ink composition comprised of an aqueous liquid vehicle, a photochromic material, and a vesicle-forming lipid, wherein vesicles of the lipid are present in the ink; U.S. Pat. No. 5,551,973, entitled "Photochromic Microemulsion Ink Compositions," discloses an ink composition which comprises an aqueous phase, an oil phase, a photochromic material, and a surfactant, the ink exhibiting a liquid crystalline gel phase at a first temperature and a liquid microemulsion phase at a second temperature higher than the first temperature; and U.S. Pat. No. 5,593,486, entitled "Photochromic Hot Melt Ink Compositions," discloses a hot melt ink composition comprising (a) an ink vehicle, the ink vehicle being a solid at about 25° C. and having a viscosity of from about 1 to about 20 centipoise at a temperature suitable for hot melt ink jet printing, the temperature being greater than about 45° C., (b) a photochromic material, and (c) an optional propellant.

Attention is directed to commonly owned and assigned U.S. Pat. No. 5,710,420, entitled "Method for Embedding and Recovering Machine-Readable Information," and which application discloses a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in the photochromic marking material from the first state to the second state; U.S. Pat. No. 5,759,729 which discloses a toner composition for the development of electrostatic latent images which toner comprises particles of a mixture of a resin and a photochromic material.

The disclosures of each the above mentioned patents and copending applications are incorporated herein by reference in their entirety. The appropriate components and processes of these patents may be selected for core and shell resins and particle formation for use in processes of the present invention in embodiments thereof.

BACKGROUND OF THE INVENTION

The present invention is generally directed to processes for the preparation of high density storage media and imaging processes thereof. More specifically, the present invention relates to compositions and processes for the preparation of optically addressable, high density, three dimensional storage media, for example, for use in digital recording media and processes.

It is highly desirable to have simple and reliable methods for preparing materials with structures comprised of nanoparticles, such as polymer encapsulated resin particles, that are ordered on a macroscopic scale, including thin film and two dimensional media, and especially three dimensional periodic arrays wherein the storage density is greatly enhanced.

PRIOR ART

A publication by Lepizzera et al., in *Macromolecules*, 1997, 30, 7953, discloses a method for preparing and characterizing latex films. The films were obtained by 1) forming core resin particles by emulsion polymerization; 2) forming a shell resin thereover by a redox reaction; and 3) coating and coalesing the resulting core/shell particles to form films. The behavior of the core particles upon elongation and deformation was characterized using atomic force microscopy.

U.S. Pat. No. 4,803,688, to Lawandy, issued Feb. 7, 1989, discloses ordered colloidal suspension optical devices, for example, a number of ordered colloidal suspension Bragg reflection optical devices are disclosed each of which comprises a receiver for receiving incident electromagnetic radiation, a modulator, responsive to at least one characteristic of the received radiation, for modulating the received radiation and an emitter for emitting the modulated radiation. The receiver, modulator and the emitter comprise a crystalline colloidal suspension having a lattice structure comprised of a plurality of parallel planes of ordered, electrically charged spheres suspended in an optically active medium, adjacent ones of the planes having a substantially uniform spacing therebetween. The optically active medium comprises molecules selected to have a predetermined index of refraction, radiation absorption, radiation emission or a nonlinear optical response property at a wavelength substantially equal to twice the spacing between the planes. The medium may contain a dye solute, the particular dye being selected to have a radiation absorption and/or emission wavelength which is substantially equal to twice the spacing between the parallel planes.

U.S. Pat. No. 5,326,692, to Brinkley et al., issued Jul. 5, 1994, discloses fluorescent microparticles with controllable enhanced stokes shift, for example, microparticles incorporating a series of two or more fluorescent dyes having overlapping excitation and emission spectra allowing efficient energy transfer from the excitation wavelength of the first dye in the series, transfer through the dyes in the series and remitted as an optical signal at the emission wavelength of last dye in the series, resulting in a desired effective Stokes shift which is controlled through selection of appropriate dyes.

U.S. Pat. No. 5,573,909, to Singer et al., issued Nov. 12, 1996, discloses fluorescent labeling using microparticles with controllable stokes shift, for example, methods for labeling or detecting one or more target materials using surface coated fluorescent microparticles with unique characteristics. The unique microparticles used to practice the invention have at least two components: an external substance or coating that is selective for each target material and an internal mixture of multiple fluorescent dyes. The mixture of dyes is a series of two or more fluorescent dyes having overlapping excitation and emission spectra allowing efficient energy transfer from the excitation wavelength of the first dye in the series, transfer through the dyes in the series and re-emitted as an optical signal at the emission wavelength of last dye in the series, resulting in a desired effective Stokes shift for the microparticle that is controlled through selection of appropriate dyes. The unique microparticles are combined with a sample thought to contain the target material(s), so that the microparticles label the target materials. The sample is then optionally illuminated, resulting in fluorescence of the microparticles that is used to detect one or more target materials.

U.S. Pat. No. 5,592,461, to Tsujioka et al., issued Jan. 7, 1997, discloses methods of recording and reproducing information using an optical recording medium comprising a masking layer on a side of a recording layer for receiving a reproducing beam. The masking layer is prepared from that containing photochromic dye molecules having absorption at the wavelength of the reproducing beam and causing a photon mode reaction by absorbing the reproducing beam to be reduced in absorption.

U.S. Pat. No. 5,648,135, to Watanabe et al., issued Jul. 15, 1997, discloses information recording medium which has a recording layer which comprises a composition containing: I) at least one organic polymer selected from the group consisting of: (a) conjugated polymers whose conformations change by thermal energy, for example, polythiophene, and (b) polymers containing as a component a diene monomer and/or an aromatic-ring-containing vinyl monomer, for example, polystyrene; and II) a dye having light-absorbing ability, for example, naphthalocyanine. Despite the recording layer is of the organic type that features non-toxicity and low manufacturing cost as advantages, the recording layer makes it possible to produce a rewritable optical disc which can be recorded by a semiconductor laser (830,780 nm) employed widely.

U.S. Pat. No. 5,268,862, to Rentzepis, issued Dec. 7, 1993, discloses a three-dimensional optical memory including an active medium, typically a photochromic material and more typically spirbenzopyran, maintained in a three-dimensional matrix, typically of polymer, is illuminated in selected regions by two UV laser light beams, typically of 532 nm. and 1064 nm. wavelength, to change from a first, spiropyran, to a second, merocyanine, stable molecular isomeric form by process of two-photon absorption. Regions not temporally and spatially coincidentally illuminated are unchanged. Later illumination of the selected regions by two green-red laser light beams, typically of 1064 nm wavelength each, causes only the second, merocyanine, isomeric form to fluoresce. This fluorescence is detectable by photodetectors as stored binary data. The three-dimensional memory may be erased by heat, or by infrared radiation, typically 2.12 microns wavelength. Use of other medium permit the three-dimensional patterning of three-dimensional forms, such as polystyrene polymer solids patterned from liquid styrene monomer. Three-dimensional displays, or other inhomogeneity patterns, can also be created.

U.S. Pat. No. 4,937,119, to Nikles et al., issued Jun. 26, 1990, discloses textured organic optical data storage media and methods of preparation comprising a textured surfaced information layer comprised of at least one encapsulated dye. The texturing is accomplished without additional treatment steps in the formation of the surface irregularities. Not only does the optical data storage medium of the present invention provide for a high degree of contrast between the medium and recorded information but also allows for the recording of a higher density of information.

U.S. Pat. No. 5,289,407, to Strickler et al., issued Feb. 22, 1994, discloses a method for three dimensional optical data storage and retrieval, for example, where in a method of high density (>1012 bits/cc) optical recording of information in a three-dimensional multilayered format, information is written in a photopolymer as submicron volume elements of altered index of refraction. The index change results from alteration of the photopolymer induced by two-photon excitation of the photo-sensitizer at the waist of a highly focused beam from a subpicosecond colliding pulse mode locked laser. Quadratic dependence of two-photon excitation on incident instantaneous intensity serves to confine crosslinking of the polymer to the focal volume; hence, bit array layers may be written with thicknesses on the order of the confocal parameter. As an example, eight well resolved bit planes can be written in a polymer film about 30 microns thick. Information written in this manner may be read with sufficient axial resolution by differential interference contrast (DIC) or confocal microscopy. This technique may be employed in multilayered write once read many (WORM) optical storage discs, for example.

U.S. Pat. No. 4,879,709, to Clark, issued Nov. 7, 1989, discloses dye-polymer optical data storage media with improved recording sensitivity, for example, media having two thermo-optically active layers which absorb light at distinct wavelengths and expansion layer in which data appear as bulges formed upon the absorption of light, and a retention layer which fixes such bulges in place until it is selectively heated to a rubbery state permitting relaxation of the expansion layer and the consequent disappearance of the bulges. In accordance with the improvement, the retention layer is modified so that it absorbs a controlled amount of light at the wavelength which is absorbed by the expansion layer, with the result that it absorbs light at both wavelengths rather than just one. Direct heating of both layers by light absorption during recordation, and accordingly a faster recordation response, are thus achieved.

U.S. Pat. No. 4,864,537, to Michl et al., issued Sep. 5, 1989, discloses polymer and dye combination suitable for use in optically recording information, and on includes a material which may exhibit the property of birefringence under selected conditions such as when stretched. This birefringence can be relaxed in localized areas by heating the localized areas. Incorporated within the material is a dye. The dye is selected so that it has a high optical density, or absorption maximum, in a specific range. This range may cover, for example, the wavelength of a gallium arsenide laser. Radiation with a wavelength within the selected range is the directed into the material at selected locations. This radiation is converted to heat, which in turn relaxes the birefringence in the localized areas or may cause other physical or chemical changes within the polymer. The localized relaxation of birefringence or other change can then be detected or "read." This allows information to be optically recorded on the polymer and subsequently detected and used.

Other patents of interest include: U.S. Pat. Nos. 5,445,853; 5,627,817; 5,449,590; and 3,946,367.

The aforementioned references are incorporated in their entirety by reference herein.

SUMMARY OF THE INVENTION

Embodiments of the present invention, include:

overcoming, or minimizing deficiencies of prior art recording media and processes, by providing media and processes with improved efficiency, improved flexibility, and improved operational economies;

providing a composition comprising a matrix comprised of particles comprised of a core resin and a shell resin thereover, wherein the core resin contains a covalently bonded photosensitive compound, and wherein the shell resin is the continuous phase of the matrix;

providing an imaging process comprising irradiating the aforementioned composition, such that the photosensitive compound is selectively and effectively addressed thereby forming a stable three dimensional image therein; and providing a process comprising:

organizing into an array particles comprised of a core resin and a shell resin and wherein the core resin contains a photosensitive compound; and heating to fix the particles into a storage media.

BRIEF DESCRIPTION OF THE DRAWINGS

FIG. 1 shows a schematic for the formation of a three-dimensional ordered polymer structure of the present invention from core-shell latices.

DETAILED DESCRIPTION OF THE INVENTION

In embodiments the present invention provides:

providing a composition comprising a matrix comprised of particles comprised of a core resin and a shell resin thereover, wherein the core resin contains a covalently bonded photosensitive compound, and wherein the shell resin is the continuous phase of the matrix; and providing a process comprising:

providing particles comprised of a core resin and a shell resin and wherein the core resin contains a photosensitive compound;

organizing the particles into a three dimensional array; and heating the array to melt the shell resin of the particles thereby fixing the particles of the array into a high density storage media.

The aforementioned organizing can be accomplished by various known chemical and physical methods for reducing the bulk volume of latex suspension systems such as concentration, evaporation, precipitation, aggregation, agglomeration, partial annealing, freeze drying, electrophoresis, and the like processes, and combinations thereof. Organizing results in the formation of a close packed but loosely held, that is fragile, three dimensional array of particles The heating, which effectively anneals the three dimensional array into a stable monolithic block, can be accomplished, for example, at from about 50 to about 110° C., and preferably from about 55 to about 100° C. for a suitable time, for example, from about 30 minutes to about 12 hours, and preferably from about 30 minutes to about 2 hours. The heating conditions depend upon for example, the size of the sample, the glass transition temperature of the shell resin, the heat transfer properties of the containing vessel and the latex, the type and level of entrapped solvent(s), and like considerations which are readily evident to one of ordinary skill in the art.

Exemplary core-shell resin particles useful in the present invention can have an average diameter from about 100 to about 3,000 nanometers, preferably from about 200 to about 2,000 nanometers, and a polydispersity or a geometric size distribution, for example, of about 1.00 to about 1.10.

The core resins selected can be any resin or mixture of resins which have a glass transition temperature which is greater than the glass transition temperature of the shell resin. It is desirable to select core resins that are comprised of polymer which can conveniently be prepared and has incorporated therein a photosensitive compound in the polymer main chain, or alternatively, the photosensitive compound can be chemically appended to the main chain or a functional group attached to the main chain. The particles can be a latex of an encapsulated polymer or copolymer wherein the core and shell resins are, for example, polymers such as styrene-butadienes, styrene acrylates, styrene methacrylates, polyesters, mixtures thereof, and the like thermoplastic polymers. A preferred core resin is a homopolymer of poly(methyl methacrylate) prepared by emulsion polymerization of methyl methacrylate monomer and as illustrated herein.

The shell resin can be any resin or mixture of resins which have a glass transition temperature which is less than the glass transition temperature of the core resin, for example, a copolymer obtained from polymerization of methyl methacrylate and butyl methacrylate monomers. As an example, the shell resin composition can be selected such that the glass transition temperature (Tg) of the shell resin is from about 20 to about 80° C. lower than the glass transition temperature of the core resin.

The weight average molecular weight (Mw) of the core and shell resins can be, for example, from about 15,000 to about 300,000, and preferably from about 15,000 to about 100,000. The weight ratio of the core resin to the shell resin can be, for example, from about 1:1,000 to about 2.3:1, and preferably from about 1:100 to about 1.5:1.

In a preferred embodiment, the core resin is crosslinked and the photosensitive compound is bound, or permanently attached to the core resin to prevent substantial physical movement or migration of the photosensitive compound between the core and the shell media, for example, a monomer having a photoresponsive chromophore can be copolymerized, such as by free radical, condensation, and the like methodologies, and without substantial changes in light sensitivity properties of the chromophore, along with conventional monomers in various amounts and thereafter crosslinked by known techniques. Crosslinking the core polymer containing, in admixture or preferably covalently bound to the core polymer, the photosensitive compound restricts, or minimizes the transport of the photosensitive compound from the cores to the shells and thereby further enhances the structural and photoresponsive integrity of the three dimensional array. The cross-linking agent can be present in the core resin in an amount, for example, from about 0.1 to about 2 molar percent, and preferably from about 0.5 to about 2.0 molar percent based on the total weight of the core resin. The photosensitive compound can be present in the core in an amount of from about 0.015 to about 2 molar percent, and preferably from about 0.05 to about 0.20 molar percent based on the total weight of the core resin. The photosensitive compound can be, for example, photochromic, fluorescent, phosphorescent, iridescent, retroreflective, and mixtures thereof, and the like compounds. Many photosensitive compounds available. An example of a suitable photosensitive compound is a 4-amino-7-nitrobenzo-2-oxa-1,3-diazol compound which compound is photobleached upon irradiation at higher writing irradiation intensities.

In the present invention the core particles can be present in the storage media in amounts of from about 0.1 to about 70 weight percent based on the total weight of the media, and the shell resin can be present in amounts of from about 30 to about 99.9 weight percent based on the total weight of the media. It will be readily understood and appreciated that the three dimensional recording media illustrated herein can also be readily adapted to systems of lower order and complexity, for example, two dimensional and one dimensional configurations and wherein the writing and recording integrity is retained or improved upon compared to the three dimensional configurations. The encapsulated resin particles of the compacted latex can be are closely packed and can be present in concentrations, for example, of from about $10^{11}$ to about $10^{14}$ particles per cubic centimeter. In the matrix storage media the concentration of particles may change substantially from the close packed particles in the first formed compact.

The present invention accordingly provides imaging compositions comprising a matrix comprised of particles comprised of a core resin and a shell resin thereover, wherein the core resin contains a covalently bonded photosensitive compound, wherein each of the resin encapsulated core particles are in a closely packed relationship with adjacent resin encapsulated core particles, and wherein the adjacent particles are fixed within the matrix by attachment to adjacent or nearest neighboring particles through shell resin bridging or resin sharing between particles. Preferably there are substantially no direct contacts between adjacent core particles.

The aforementioned imaging compositions enable imaging processes comprising:

a first irradiating of a composition comprising a matrix comprised of particles comprised of a core resin and a shell resin thereover, wherein the core resin contains a covalently bonded photosensitive compound, wherein the particles are in a closely packed relationship with adjacent particles, and wherein the adjacent particles are physically attached thereto through shell resin bridging or sharing, such that the photosensitive compound is selectively and effectively addressed thereby forming a stable three dimensional image therein; and a second irradiating of the resulting addressed composition such that a three dimensional image or images are selectively and effectively observable with a microscopic.

The first irradiating can be accomplished for an effective time interval of from about 1 microsecond to about 30 seconds, at an effective intensity, and at an effective wavelength of light from about 250 to about 800 nanometers, and wherein the second irradiating is accomplished at from about a 20 to about a 30 fold reduced intensity compared to the first irradiating and at an effective wavelength of light from about 250 to about 800 nanometers. The first and second irradiating wavelengths can be the same or different wavelengths within the aforementioned wavelength range, and for simplicity the wavelengths are preferably the same.

The image resulting from the first irradiation is stable to light in the wavelength range of from about 250 to about 800 nanometers, and wherein the stable image can be repeatedly and reliably read by optical and related methods from about 100 to about 1,000,000 times or more.

The imaging process can further include subsequently focusing an irradiating laser beam in selected planes of the optically-active material thereby inducing photo-generated changes in the optical and photoactive properties of the media as illustrated herein, and wherein writing or recording of optical data with three-dimensional resolution is accomplished. Resolution depends upon the wavelength(s) of light selected and upon the optics of the microscope or imaging system employed, for example, lateral resolutions of about 0.3 microns and vertical resolutions of about 0.7 microns were available using the microscope described in the working examples below.

Advantages of the present invention include providing for simple manufacturing processes for three dimensional optical recording media by employing previously prepared and well defined engineered subunit particles, such as, polymeric latex or colloidal particles with an encapsulating shell thereover; and forming the working three dimensional structure is readily accomplished by simple heating, so that the three dimensional ordering of the structure does not have to be exact to provide reliable writing and reading capability.

Monodisperse core shell lattices or dispersions can be prepared in accordance with, for example, *J. Appl. Pol. Sci.*, 1995, 58, 2047, and *J. Pol. Sci., Part A: Pol. Chem.*, 1995, 33, 1597, the disclosures of which are incorporated herein by reference in there entirety, and which methods provide particles which possess high dispersion stability, narrow particle size distributions, and are free of secondary particles or seed generations.

Either or both the core resin or the shell resin components can contain a photosensitive compound, and which photosensitive compound can be in physical admixture with the resin, and preferably the compound is covalently bound to either the core resin or the shell resin, and more preferably the photosensitive compound is covalently bound to the core resin. In embodiments, when both the core resin and the shell resin can contain one or more photosensitive compounds, and preferably, the photosensitive compounds chosen for the respective resin components are different, for example, in identity and or in amount.

In the present invention there are provided three-dimensional structures which can be used for optical memory devices and optical recording processes, and wherein, for example, each core particle containing a photosensitive compound can effectuate a single bit or pixel of recorded information. By varying the size of the core resin particles and using different photosensitive compounds it is possible to effectively match a range of wavelengths to the core resin and photosensitive compound used for recording.

Referring to the Figure, there is illustrated a schematic of an exemplary preparative sequence for the preparation of the three dimensional high density storage media of the present invention. First, there are provided core-shell latex particles 1 with a photosensitive compound covalently bound to latex core particles 2, while the shell 3 resins are substantially optically insensitive in the same region of the electromagnetic spectrum, and the shell resins are preferably optically inert. The core-shell latex particles can be prepared by conventional core-shell or encapsulation methodologies and as illustrated herein. Second, the latex particles 1 are organized by concentrating 10 the latex particles, by known techniques such as sedimentation followed or accompanied by evaporation, into a three dimensional compact 20 wherein the latex particles are closely packed and the shells of adjacent particles are in intimate contact. For example, water evaporation causes an increase in the concentration of latex particles in the system. Thereafter, the three dimensional compact 20 is further condensed or compacted into a monolithic polymer "block" 30, by for example heating 40 for a sufficient time and sufficient temperature to effect partial or flash melting of shell resin polymers so that the core particles 32 remain substantially separated or suspended and spaced apart from adjacent core particles by the fused and resolidified shell resin which now forms the continuous resin matrix 33. Heating, by for example thermal or non conflicting radiative means, accomplishes annealing of the latex shell resin coating which has a glass transition temperature significantly lower than cores and results in the formation of the transparent optically inert matrix 33, and wherein the size, shape, and surface morphology of the core particles 32 contained within the inert matrix are substantially unchanged from the core particles in the initial latex suspension.

The structure of the optically sensitive three-dimensional material can be characterized by, for example, Laser Confocal Fluorescent Microscopy (LCFM). Optically-active rigid cores typically appear as bright spots distributed in a black optically-inert matrix resulting from the annealed shell resins. The dimensions of cores and shells generally determine the average distance between the planes of particles in the z-direction, that is, the distance between the planes of optical recording. For example, when the core and the shell diameter were about 640 and 1040 nanometers, respectively, the interplane separation was about 0.9 micron, and when the core and the shell diameter were about 360 and 530 nanometers, respectively, the separation was about 0.5 micron.

The three-dimensional composition and imaging processes of the present invention are highly suitable in, for example, for optical recording. In an example imaging application, irradiation of the annealed block composite material with a laser beam focused in a specific plane induced photo-bleaching of the photosensitive compound contained in the core polymer particles which resulted in the appearance of black marks. Reading of the recorded information can be accomplished by irradiation of the material with the same or similar laser beam with the exception that the incident laser intensity is preferably reduced to increase the useful readable lifetime of the material.

It will be readily appreciated by one of ordinary skill in the art that a mixture or mixtures of monodisperse latices can be selected if desired, for example, to introduce non uniformity to the three dimensional structure, or to create periodic variation in the tertiary lattice structure for the purpose of further refining and elaborating upon the writing and recording processes illustrated herein.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLE I

Procedure For Latex Preparation

Lattices were prepared by a multistage emulsion polymerization using a semicontinuous scheme. All stages of latex particle formation were carried out at about 80° C. in nitrogen atmosphere. Latex seeding was carried out by mixing 35 grams water, 0.1 grams potassium persulfate, and 1.5 grams methylmethacrylate, and stirring for 1 hour. The a mixture consisting of 13.5 methylmethacrylate, 0.044 grams dodecyl mercaptan, 0.534 grams ethylene glycol dimethacrylate, and 0.005 gram of a fluorescent dye, 4-amino-7-nitrobenzo-2-oxa-1,3-diazol (NBD)—labeled methyl methacrylate (MMA) monomer was fed to the reactor via fluid metering pump at a constant rate. Pumping time was typically for from about 3 to about 4 hours. After the monomer addition was complete, the reaction was continued for about 1 hour. For second and further stages of emulsion polymerization 20 grams, for example, of latex dispersion from previous stages was mixed with 40 grams of water and 0.005 grams 2,2'azobis(2-methyl-proprionitrile) (AIBN). The a mixture consisting of 7 grams methyl methacrylate, 0.052 grams AIBN, 0.032 grams dodecyl mercaptan, 0.276 grams ethylene glycol dimethacrylate, and 0.004 gram of NBD—labeled MMA monomer to the reactor via fluid metering pump at a constant rate. Pumping time was typically for from about 3 to about 4 hours. The preparation of the shell resin was accomplished by adding a mixture of 5 grams methylmethacrylate monomer, 2.5 grams butyl methacrylate, 0.034 grams dodecyl mercaptan, 0.049 grams of azobisisobutyronitrile as a non-ionic initiator, to the 10 grams of core particle dispersion in about 20 grams of water over about 3 hours. The resulting latex was subsequently compacted, annealed, and characterized, as described below.

EXAMPLE II

Procedure For the Preparation of Three Dimentional Optically Active Polymer Material A latex in which the shell composition was a copolymer of methyl methacrylate and n-butyl methacrylate (copoly (BMA/MMA)) 33/67 by weight ratio and solid content 15 weight percent was placed in plastic containers and allowed to sediment and dry. The dry samples were annealed at 110° C. for about 12 hours.

EXAMPLE III

Procedure For Characterization of Latex Particles and the Polymer Compact

Measurements of the glass transition temperature of the core and shell forming polymers were carried out on a Perkin-Elmer DSC-7 differential scanning calorimeter at a scanning rate of 5 degrees per minute.

Dimensions of latex particles were measured by scanning electron microscopy (SEM, Hitachi S-570). A drop of a dilute latex dispersion was placed on an aluminum stub, and allowed to dry. A gold coating was deposited on the surface of latex particles to prevent charging and distortion of the specimen by the electron beam.

The morphology of the polymer block material, that is the aforementioned annealed optically active material, was examined on a Bio-Rad MRC 600 confocal fluorescent microscope (LCFM). The 488 nanometer line of an argon ion laser was employed for the excitation of the NBD dyestuff contained in the core resin. Depth for this wavelength was estimated to be about 0.7 microns. SEM and LCFM images were analyzed using Image Tools software, available from The University of Texas, Health Science Center.

EXAMPLE IV

Procedure For Writing or Recording Information

For writing or recording information with the three dimensional recording media a twenty-five(25) fold increase of the light intensity of the Laser Confocal Fluorescent Microscope was used compared to that used for the aforementioned morphology characterization. That irradiation induced photo-bleaching of the photosensitive compound or chromophore contained in the core particles. By subsequently focusing light in a particular plane in the z-direction recording was provided in three-dimensional space.

EXAMPLE V

Procedure For Reading the Recorded Information

Readout was accomplished at about a 25 fold lower intensity of photoirradiation compared to that of the aforementioned writing procedure. Submicroscopic black marks were observed under microscopic examination and which marks correspond to the bleached areas on the sample.

Other modifications of the present invention may occur to one of ordinary skill in the art based upon a review of the present application and these modifications, including equivalents thereof, are intended to be included within the scope of the present invention.

What is claimed is:

1. A composition comprising:
a matrix comprised of a discrete phase comprised of an ordered array of core particles containing a first resin and a photosensitive compound, and an annealed continuous phase comprised of a second resin, wherein the photosensitive compound is covalently bound to the first resin, wherein the continuous phase is substantially free of the photosensitive compound, and wherein if the photosensitive compound is irradiated then the optical properties of the bound core particles change.

2. A composition in accordance with claim 1, wherein the core particles have an average diameter of from about 100 to about 3,000 nanometers and a polydispersity of about 1.00 to about 1.10.

3. A composition in accordance with claim 1, wherein the first resin is a polyacrylate, and wherein the second resin is a copolymer of methyl methacrylate and butyl methacrylate monomers.

4. A composition in accordance with claim 1 wherein the first and second resins are polymers selected from the group consisting of styrene-butadienes, styrene acrylates, styrene methacrylates, polyesters, and mixtures thereof.

5. A composition in accordance with claim 1, wherein the first resin is crosslinked with a crosslinking agent present in the first resin in an amount of from about 0.5 to about 2.0 molar percent based on the total weight of the first resin.

6. A composition in accordance with claim 1, wherein the glass transition temperature (Tg) of the second resin is from about 20 to about 80° C. lower than the glass transition temperature of the first resin.

7. A composition in accordance with claim 1, wherein the core particles are present in an amount of from about 0.1 to about 70 weight percent based on the total weight of the composition, wherein the second resin is present in amounts of from about 30 to about 99.9 weight percent based on the total weight of the composition, and wherein the core particles are separated from nearest neighboring core particles by said second resin continuous phase.

8. A composition in accordance with claim 1, wherein the core particles are present in a concentration of from about $10^{11}$ to about $10^{14}$ particles per cubic centimeter.

9. A composition in accordance with claim 1 wherein the weight ratio of the first resin to the second resin is from about 1:1,000 to about 2.3:1.

10. A composition in accordance with claim 1, wherein the photosensitive compound is present in an amount of from about 0.015 to about 2 molar percent based on the total weight of the first resin.

11. A composition in accordance with claim 1, wherein the photosensitive compound is selected from the group consisting of photochromic, fluorescent, phosphorescent, iridescent, retroreflective, and mixtures thereof.

12. A composition in accordance with claim 1, wherein the photosensitive compound is 4-amino-7-nitrobenzo-2-oxa-1,3-diazol.

13. A process comprising:
writing comprising a first irradiation of selected core particles of the discrete phase of the composition of claim 1; and
reading comprising a second irradiation of the selected core particles of the first irradiation, wherein the first irradiation is more energetic than the second irradiation by from about 20 to about 30 times.

14. A process in accordance with claim 13, wherein the first irradiation and the second irradiation are accomplished for an effective time interval of from about 1 microsecond to about 30 seconds, at an effective intensity, and at an effective wavelength of light from about 250 to about 800 nanometers.

15. A process in accordance with claim 13, wherein the resulting written image is stable to light in the wavelength range of from about 250 to about 800 nanometers, and wherein the reading of the written image can be repeatedly and reliably accomplished from about 100 to about 1,000,000 times.

16. A process comprising:
fusing an array of particles comprised of a core resin with a shell resin thereover to fix the particles into a matrix, wherein the core resin contains a photosensitive compound, and wherein the core resin containing the photosensitive compound comprises the discrete phase and the shell resin comprises the continuous phase of the matrix.

17. A process in accordance with claim 16, wherein the fusing is accomplished by concentration, sedimentation, evaporation, precipitation, aggregation, agglomeration, partial annealing, freeze drying, electrophoresis, or combinations thereof.

18. A process in accordance with claim 16, wherein the fusing is accomplished by heating at from about 50° C. to about 110° C. for from about 30 minutes to about 12 hours.

19. A process in accordance with claim 16, further comprising subsequently focusing an irradiating beam in selected planes of the resulting matrix thereby inducing selected photogenerated changes in the optical and photoactive properties of the irradiated particles, and wherein writing or recording optical data with three-dimensional resolution is accomplished.

* * * * *